United States Patent
Wang et al.

(10) Patent No.: US 12,032,065 B2
(45) Date of Patent: Jul. 9, 2024

(54) SYSTEM AND METHOD FOR HISTOGRAM BINNING FOR DEPTH DETECTION

(71) Applicant: SAMSUNG ELECTRONICS CO., LTD., Suwon-si (KR)

(72) Inventors: Chunji Wang, Pasadena, CA (US); Yibing Michelle Wang, Temple City, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 831 days.

(21) Appl. No.: 16/940,237

(22) Filed: Jul. 27, 2020

(65) Prior Publication Data
US 2021/0389462 A1    Dec. 16, 2021

Related U.S. Application Data

(60) Provisional application No. 63/037,244, filed on Jun. 10, 2020.

(51) Int. Cl.
    *G01S 17/89*    (2020.01)
    *G01S 7/481*    (2006.01)
    (Continued)

(52) U.S. Cl.
    CPC ............ *G01S 17/89* (2013.01); *G01S 7/4816* (2013.01); *G01S 7/4863* (2013.01);
    (Continued)

(58) Field of Classification Search
    CPC .......... G01S 17/89; G01S 17/10; G01S 17/42; G01S 7/4816; G01S 7/4863; G01S 7/4865
    See application file for complete search history.

(56) References Cited

U.S. PATENT DOCUMENTS

| 10,317,529 B2 | 6/2019 | Shu et al. |
|---|---|---|
| 10,416,293 B2 | 9/2019 | Buckley et al. |
| 2021/0382964 A1* | 12/2021 | Moore ................ G06F 11/0703 |

FOREIGN PATENT DOCUMENTS

| CN | 110596725 A | 12/2019 | |
|---|---|---|---|
| WO | WO-2019102751 A1 * | 5/2019 | ............... G01C 3/06 |
| WO | WO 2020/049203 A1 | 3/2020 | |

OTHER PUBLICATIONS

Machine Translation of WO-2019102751-A1 taken from Espacenet Retrieved Apr. 7, 2023 (Year: 2023).*

(Continued)

*Primary Examiner* — Luke D Ratcliffe
(74) *Attorney, Agent, or Firm* — Lewis Roca Rothgerber Christie LLP

(57) ABSTRACT

Provided is a depth detection system and method of histogram binning for depth detection. The depth detection system includes a light source configured to emit a light pulse toward an object, an optical sensor configured to detect the light pulse reflecting off the object, the optical sensor including a first sensing pixel configured to detect the light pulse for a first event count according to the light pulse reflecting off the object, and a second sensing pixel configured to detect the light pulse for a second event count according to the light pulse reflecting off the object, and a processing circuit configured to determine a first aggregated histogram corresponding to the first sensing pixel based on the first event count and the second event count and determine a first peak of the first aggregated histogram to determine a first time of flight associated with the first sensing pixel.

17 Claims, 10 Drawing Sheets

(51) Int. Cl.
*G01S 7/4863* (2020.01)
*G01S 7/4865* (2020.01)
*G01S 17/10* (2020.01)
*G01S 17/42* (2006.01)

(52) U.S. Cl.
CPC ............ *G01S 7/4865* (2013.01); *G01S 17/10* (2013.01); *G01S 17/42* (2013.01)

(56) References Cited

OTHER PUBLICATIONS

Machine English Translation of CN 110596725 A (20 pages).
Machine English Translation of WO 2020/049203 A1 (7 pages).

\* cited by examiner

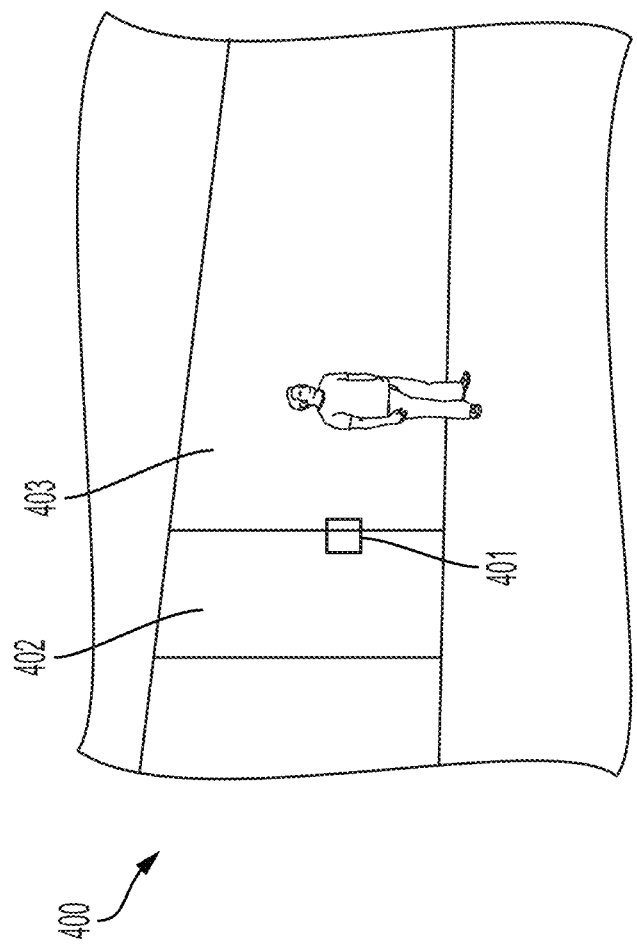

SYSTEM AND METHOD FOR HISTOGRAM BINNING FOR DEPTH DETECTION

CROSS-REFERENCE TO RELATED APPLICATION

This application claims priority to and the benefit of U.S. Provisional Application No. 63/037,244, filed on Jun. 10, 2020, entitled "HISTOGRAM BINNING OF NEIGHBOR PIXELS BEFORE PEAK DETECTION TO IMPROVE RANGE MEASURE FROM LIDAR DATA," the entire content of which is incorporated by reference herein.

BACKGROUND

1. Field

Aspects of one or more embodiments of the present disclosure relate to systems and methods for depth detection.

2. Description of the Related Art

In recent years, optical depth detection systems such as Light Detection and Ranging ("lidar") systems have been applied to a wide range of applications in various environments to produce digital representations of objects. For example, lidar systems may use a pulsed laser to illuminate a surface of a target such that the pulsed laser reflects from the target back towards a sensor of the lidar system. The round-trip time (e.g., time-of-flight) of the light emitted from the lidar system and reflected back to the sensor may be used to measure distance (e.g., depth) from the surface of the target. In other words, lidar may use time-of-flight techniques to measure distances using the time that it takes for photons to travel between two points, from the laser of the lidar system to a target and then back to the sensor of the lidar system.

However, it can be difficult under real-world conditions to detect and analyze reflected light amongst ambient background light. Several factors such as the reflectivity of the target, the relative position of the target, the distance to the target, environmental interference, and/or the like, may adversely impact the lidar Signal-to-Noise Ratio ("SNR"), thereby making it difficult to accurately measure the time-of-flight. For example, increased target distance, low target reflectivity, and/or high ambient lighting may reduce the SNR.

The above information disclosed in this Background section is for enhancement of understanding of the background of the present disclosure, and therefore, it may contain information that does not constitute prior art.

SUMMARY

One or more example embodiments of the present disclosure are directed to a system and method for depth detection by binning individual histograms from a plurality of sensing pixels.

According to one embodiment of the present disclosure, there is provided a depth detection system. The depth detection system including a light source configured to emit a light pulse toward an object, an optical sensor configured to detect the light pulse reflecting off the object, the optical sensor including a first sensing pixel configured to detect the light pulse for a first event count according to the light pulse reflecting off the object, and a second sensing pixel configured to detect the light pulse for a second event count according to the light pulse reflecting off the object, and a processing circuit configured to determine a first aggregated histogram corresponding to the first sensing pixel based on the first event count and the second event count, and determine a first peak of the first aggregated histogram to determine a first time of flight associated with the first sensing pixel.

Each of the first sensing pixel and the second sensing pixel may include a single SPAD.

The processing circuit may be further configured to determine a second peak of the first aggregated histogram to determine a second time of flight associated with the first sensing pixel.

The depth detection system may further include a third sensing pixel configured to detect the light pulse for a third event count according to the light pulse reflecting off the object. The first sensing pixel, the second sensing pixel, and the third sensing pixel may be arranged in a sensing pixel row. The processing circuit may be further configured to determine the first aggregated histogram corresponding to the first sensing pixel based on the first event count, the second event count, and the third event count.

The depth detection system may further include a third sensing pixel configured to detect the light pulse for a third event count according to the light pulse reflecting off the object. The first sensing pixel, the second sensing pixel, and the third sensing pixel may be arranged in a sensing pixel column. The processing circuit may be further configured to determine the first aggregated histogram corresponding to the first sensing pixel based on the first event count, the second event count, and the third event count.

The processing circuit may be further configured to determine the first aggregated histogram corresponding to the first sensing pixel based on the first event count and the second event count by applying a weight to the first event count or the second event count.

The processing circuit may be further configured to determine a first histogram based on the first event count, determine a second histogram based on the second event count, and determine the first aggregated histogram corresponding to the first sensing pixel based on the first event count and the second event count by binning the second histogram with the first histogram in response to whether a threshold for correlation between the first histogram and the second histogram is satisfied.

The processing circuit may be further configured to determine a first histogram based on the first event count, determine a second histogram based on the second event count, and determine the first aggregated histogram corresponding to the first sensing pixel based on the first event count and the second event count by binning the second histogram with the first histogram in response to whether a threshold for signal quality indicated by the second histogram is satisfied.

According to one embodiment of the present disclosure, there is provided a method of histogram binning. The method including emitting, by a light source, a light pulse toward an object, detecting, by an optical sensor, the light pulse reflecting off the object, detecting the light pulse for a first event count, by a first sensing pixel of the optical sensor, according to the light pulse reflecting off the object, detecting the light pulse for a second event count, by a second sensing pixel of the optical sensor, according to the light pulse reflecting off the object, determining, by a processing circuit, a first aggregated histogram corresponding to the first sensing pixel based on the first event count and the second event count, and determining, by the processing circuit, a first peak of the first aggregated histogram to determine a first time of flight associated with the first sensing pixel.

Each of the first sensing pixel and the second sensing pixel may include a single SPAD.

The method may further include determining, by the processing circuit, a second peak of the first aggregated histogram to determine a second time of flight associated with the first sensing pixel.

The method may further include detecting the light pulse for a third event count, by a third sensing pixel of the optical sensor, according to the light pulse reflecting off the object. The first sensing pixel, the second sensing pixel, and the third sensing pixel may be arranged in a sensing pixel row. The determining, by the processing circuit, the first aggregated histogram corresponding to the first sensing pixel may be based on the first event count, the second event count, and the third event count.

The method may further include detecting the light pulse for a third event count, by a third sensing pixel of the optical sensor, according to the light pulse reflecting off the object. The first sensing pixel, the second sensing pixel, and the third sensing pixel may be arranged in a sensing pixel column. The determining, by the processing circuit, the first aggregated histogram corresponding to the first sensing pixel may be based on the first event count, the second event count, and the third event count.

The determining, by the processing circuit, the first aggregated histogram corresponding to the first sensing pixel based on the first event count and the second event count includes applying a weight to the first event count or the second event count.

The method may further include determining, by the processing circuit, a first histogram based on the first event count, and determining, by the processing circuit, a second histogram based on the second event count. The determining, by the processing circuit, the first aggregated histogram corresponding to the first sensing pixel based on the first event count and the second event count may include binning the second histogram with the first histogram in response to whether a threshold for correlation between the first histogram and the second histogram is satisfied.

The method may further include determining, by the processing circuit, a first histogram based on the first event count, and determining, by the processing circuit, a second histogram based on the second event count. The determining, by the processing circuit, the first aggregated histogram corresponding to the first sensing pixel based on the first event count and the second event count may include binning the second histogram with the first histogram in response to whether a threshold for signal quality indicated by the second histogram is satisfied.

According to one embodiment of the present disclosure, there is provided a method of histogram binning. The method including selecting, by a processing circuit, a first sensing pixel of interest, generating, by the processing circuit, a first histogram for a sensing pixel of interest and a second histogram for a sensing pixel adjacent to the sensing pixel of interest based on signals received by an optical sensor, generating, by the processing circuit, a first aggregated histogram for the first sensing pixel of interest based on the first histogram and the second histogram, and determining, by the processing circuit, a first peak of the first aggregated histogram to determine a first time of flight associated with the sensing pixel of interest.

The method may further include determining, by the processing circuit, a second peak of the first aggregated histogram to determine a second time of flight associated with the sensing pixel of interest.

The generating, by the processing circuit, the first aggregated histogram for the first sensing pixel of interest based on the first histogram and the second histogram may include applying a weight to the first histogram or the second histogram prior to binning the first histogram with the second histogram.

The generating, by the processing circuit, the first aggregated histogram for the first sensing pixel of interest based on the first histogram and the second histogram may include binning the first histogram with the second histogram in response to a threshold for signal quality indicated by the second histogram being satisfied.

BRIEF DESCRIPTION OF THE DRAWINGS

The above and other aspects and features of the present disclosure will become more apparent to those skilled in the art from the following detailed description of the example embodiments with reference to the accompanying drawings.

FIG. 4A is a view including a plurality of targets according to one or more embodiments of the present disclosure.

DETAILED DESCRIPTION

Figure 1:
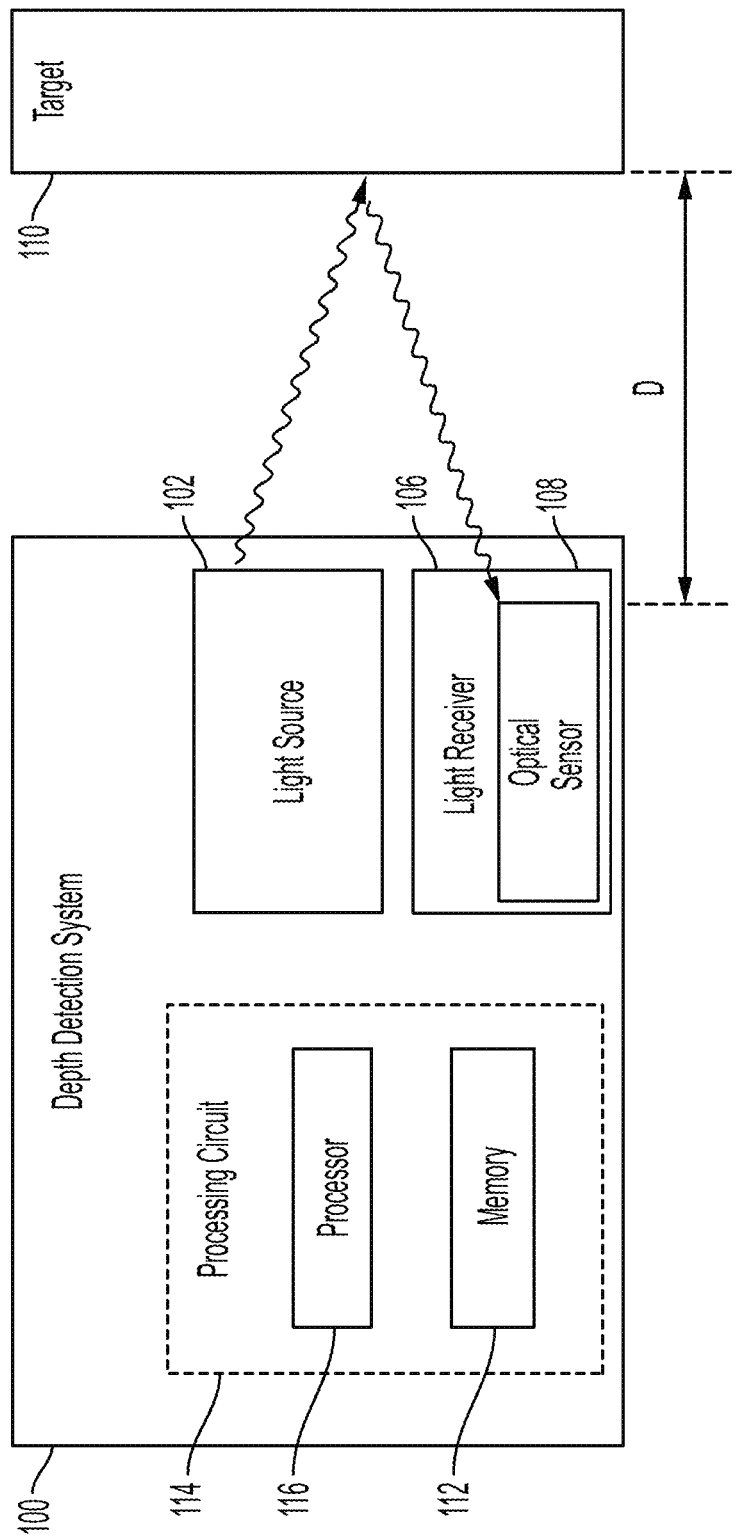
FIG. 1 is a block diagram of a depth detection system, according to one or more embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Generally, lidar systems, for example, such as direct time-of-flight (TOF) lidar systems, measure a distance (e.g., a depth) of an object therefrom by emitting light pulses (e.g., laser pulses) toward the object and measuring a time it takes for the light pulses to reflect off the object and to be detected by a sensor of the lidar system. In order to reduce noise, for example, from ambient light, repeated measurements may be taken to generate an individual histogram of relative TOFs based on the repeated measurements, and a peak of the individual histogram may be calculated to detect an event (e.g., to detect a depth of a point or an area of the object reflecting back the light pulses). In this case, however, the detected peak may suffer from low SNR, for example, due to ambient light, such that the detected peak may be a false-positive event.

In order to improve the SNR, some lidar systems may increase the number of measurements taken, or may include more photodetectors (e.g., single-photon avalanche diode (SPAD)) for each sensing pixel. For example, by increasing the number of measurements taken, some lidar systems may distinguish real events from noise according to a maximum peak of the repeated measurements, and any other peaks in the repeated measurements may be presumed to be from the noise (e.g., from ambient light and/or the like). Increasing the number of measurements taken may decrease speed, and increasing the number of photodetectors for each of the sensing pixels may decrease resolution. However, speed and resolution may be critical for various computer vision applications, for example, such as object detection for autonomous driving applications and/or the like.

Further, these lidar systems may be unable to detect multiple echoes received at a single sensing pixel, which may indicate an intersection or crossing of two surfaces having different depths from each other. For example, because any other peaks in the multiple measurements may be presumed to be from the noise, these lidar systems may be unable to distinguish the noise from other real events received by the single sensing pixel. However, detecting multiple events at a single sensing pixel may improve performance of a computer vision application, for example, by indicating an edge (or the border) where the two surfaces having different depths intersect or cross each other.

According to one or more embodiments of the present disclosure, an individual histogram of a sensing pixel of interest may be binned with individual histograms from neighboring sensing pixels (e.g., one or more adjacent and/or directly adjacent sensing pixels) to generate an aggregated histogram for the sensing pixel of interest. By generating aggregated histograms for each sensing pixel of a sensing pixel array, the major peak TOFs of the sensing pixel array may have increased stability, improved edge detection, and/or increased SNR compared to major peak TOFs of the sensing pixel array based on individual histograms. Moreover, generating an aggregated histogram by binning individual histograms from neighboring sensing pixels (e.g., one or more adjacent and/or directly adjacent sensing pixels) does not increase the number of measurements taken which may speed up the process of determining a peak TOF.

Further, instead of increasing the number of photodetectors for each sensing pixel, thereby reducing resolution, the binning method of one or more embodiments of the present disclosure may avoid resolution loss. Accordingly, in one or more embodiments of the present disclosure, a single photodetector such as a SPAD may be included in each sensing pixel to improve or provide high resolution, which may be critical for object detection, for example, in autonomous driving applications and/or the like, to identify distant targets.

In one or more embodiments, the system may detect multiple echoes, indicating an edge or a border where two surfaces cross or intersect. For example, instead of identifying a single peak (e.g., a maximum peak or a major peak) to measure a major peak TOF, the improved SNR based on an aggregated histogram from neighboring sensing pixels (e.g., one or more adjacent and/or directly adjacent sensing pixels) may enable the processing circuit to detect multiple echoes (e.g., one or more peaks) in the aggregated histogram for each sensing pixel to provide a major peak TOF and one or more additional minor peak TOFs for additional information from the aggregated histogram of a single sensing pixel.

In one or more embodiments, linear filtering may be introduced during binning to generate aggregated histograms by applying weights to individual histograms. Accordingly, instead of applying linear filtering in a subsequent process after generating an aggregated histogram for a sensing pixel, linear filtering may already be integrated into the generation of the aggregated histogram.

In one or more embodiments, an on-the-fly method and/or a post-processing method may be used. The post-processing method refers to generating an aggregated histogram based on stored individual histograms. In other words, the post-processing method may not occur immediately and may generate an aggregated histogram for each sensing pixel at set (e.g., predetermined) or variable intervals (e.g., intervals based on time, number of event counts, and/or any other suitable factors) using individual histograms stored in memory. Based on the aggregated histograms, a processing circuit may determine major peak TOFs and/or minor peak TOFs (e.g., if multiple echoes are detected). In one or more embodiments, the on-the-fly method refers to generating and updating an aggregated histogram in real-time or substantially real-time to provide major peak TOFs and/or minor peak TOFs (e.g., if multiple echoes are detected) "on-the-fly." For example, as each sensing pixel receives a reflected light signal, a corresponding event count is binned in the relevant aggregated histograms. Accordingly, storing individual histograms in memory is optional, and therefore, memory may be saved compared to the "post-processing" method because any number (e.g., zero to all) of the individual histograms may be selectively saved as desired.

In one or more embodiments, conditional binning may consider data for each sensing pixel individually to determine whether an individual histogram should be binned to generate an aggregated histogram. For example, the signal quality indicated by an individual histogram for each sensing pixel may be reviewed to determine whether the signal quality is high enough (i.e., above a set threshold) to bin with the individual histogram of another sensing pixel. As another example, correlation between individual histograms for two sensing pixels may be measured (i.e., above a set threshold) before determining whether the individual histograms for those two sensing pixels should be binned together to generate an aggregated histogram. Based on these conditions, the aggregated histogram may be modified to better reflect higher quality signals, improve SNR, and/or the like as desired by the user. Because conditional binning may be based on the availability of individual histograms before binning, conditional binning may not be implemented in the "on-the-fly" case.

The above and other aspects and features of one or more example embodiments of the present disclosure will now be described in more detail with reference to the figures.

FIG. 1 is a block diagram of a depth detection system, according to one or more embodiments of the present disclosure.

Referring to FIG. 1, according to one or more example embodiments of the present disclosure, a depth detection system 100 may acquire information corresponding to its surroundings in an environment. For example, the depth detection system 100 may be a Light Detection and Ranging ("lidar") system that may scan an environment, and may generate sensing data conveying information about objects and/or the like located within a suitable proximity to the depth detection system 100.

In one or more embodiments, the depth detection system 100 includes a light source 102, and a light receiver 106 including an optical sensor 108. Together, these components enable the depth detection system 100 to determine a distance (e.g., a depth) D of a target 110 from the depth detection system 100 that is located in the environment. For example, the light source 102 (e.g., a laser or any other suitable light emitting device) of the depth detection system 100 may emit a light pulse (e.g., a laser pulse) toward the target 110, such that the light pulse may be incident on a surface of the target 110 and may be reflected back to the optical sensor 108 of the light receiver 106. Based on the time elapsed (i.e., TOF) from emission of the light pulse to detection of the reflected light pulse, the depth detection system 100 may determine the distance D (e.g., the depth) to the surface of the target 110.

In one or more embodiments, the optical sensor 108 of the light receiver 106 may include a sensing pixel array, for example, a single-photon avalanche diode ("SPAD") array, but the present disclosure is not limited thereto. For example, in other embodiments, the optical sensor 108 may be any suitable optical sensor capable of detecting the light pulses reflecting off the target 110 such as, for example, an avalanche photodiode ("APD") array and/or the like. In the case of an APD array, histograms may be replaced with waveforms and the waveforms may be treated in a substantially similar manner to the histograms described throughout the present disclosure. Accordingly, one or more embodiments of the present disclosure may include a depth detection system 100 using a discrete return lidar system (i.e., the system returns a single or a few TOF values associated with each laser pulse), and in other embodiments, the depth detection system 100 may use a full waveform lidar system (i.e., the system returns a full waveform based on a distribution of detected light associated with each laser pulse).

In one or more embodiments, the depth detection system 100 may include a processing circuit 114 including a processor 116 and memory 112. The processor 116 may be implemented as a general purpose processor, an application specific integrated circuit (ASIC), one or more field programmable gate arrays (FPGAs), a group of processing components, or other suitable electronic processing components. The memory 112 (e.g., memory, memory unit, storage device, and/or the like) may include one or more devices (e.g., RAM, ROM, Flash memory, hard disk storage, and/or the like) for storing data and/or computer code for completing or facilitating the various processes described in the present application. The memory 112 may be or include volatile memory or non-volatile memory. The memory 112 may include database components, object code components, script components, or any other type of information structure for supporting the various activities and information structures described in the present application. According to an example embodiment, the memory 112 may be communicably connected to the processor 116 via the processing circuit 114, and includes computer code for executing (e.g., by the processing circuit 114 and/or the processor 116) one or more processes described herein.

In one or more embodiments, the processing circuit 114 may be implemented within the depth detection system 100 as an internal processing circuit of the depth detection system 100. In other embodiments, the processing circuit 114 or one or more components thereof (e.g., components executing instructions in memory to perform the methods described in the present disclosure) may be distributed across multiple servers or computers (e.g., that can exist in distributed locations).

In one or more embodiments, the processing circuit 114 may execute instructions in memory 112 to track TOF, generate histograms, bin individual histograms to generate aggregated histograms, detect one or more echoes (e.g., detect one or more peaks), and/or the like.

In brief overview, the processing circuit 114 may track a flight time (e.g., relative TOF) of each of the light pulses emitted from the light source 102. For example, the processing circuit 114 may track a time when a light pulse is emitted from the light source 102, and a time when a reflected light signal corresponding to the light pulse reflected off an object is detected by a sensing pixel of the light receiver 106. The processing circuit 114 may store, in memory 112, an event count and relative TOF (e.g., in nanoseconds) corresponding to the reflected light signal received from the sensing pixel.

In one or more embodiments, the processing circuit 114 may generate a histogram for each of the sensing pixels according to a number of light sensing signals received by the sensing pixel. For example, histograms of each of the sensing pixels may include a number of event counts received by the sensing pixel at relative TOFs. In a non-limiting example, the light source 102 may emit 20 light pulses, in which case, a sensing pixel may provide a total of 20 reflected light signals corresponding to the detection of light reflected from the 20 light pulses. Therefore, the processing circuit 114 may generate a histogram for the sensing pixel with a range of event counts (i.e., reflected light signals) across a range of relative TOFs.

The processing circuit 114 may bin the individual histograms of each sensing pixel with the individual histograms of one or more neighboring sensing pixels (e.g., one or more adjacent and/or directly adjacent sensing pixels) such that an aggregated histogram for each sensing pixel is formed. In this case, in a non-limiting example, the aggregated histogram for each of the sensing pixels may include event counts corresponding to reflected light signals provided by the sensing pixel and event counts corresponding to reflected light signals provided by one or more neighboring sensing pixels (e.g., one or more adjacent and/or directly adjacent sensing pixels) such that the total event counts in the aggregated histogram for each of the sensing pixels may be increased without increasing the number of light pulses emitted. The processing circuit 114 may determine one or more peaks from the aggregated histogram to determine the distance (or depth) to one or more reflecting surfaces of one or more targets (e.g., objects).

Accordingly, the depth detection system 100 may include the processing circuit 114 that communicates with the memory 112 to determine or generate an aggregated histogram. The aggregated histogram may include a number of events detected over a range of relative TOFs based on a plurality of sensing pixels. After generating an aggregated histogram, one or more peaks may be identified to indicate a major peak TOF and/or one or more minor peak TOFs. In one or more embodiments, the major peak TOF (e.g., a relative TOF corresponding to a maximum peak or a major peak in the aggregated histogram) may be used to calculate distance from the target 110, and a minor peak TOF (e.g., a minor peak or a local maximum different from the maximum peak) may be used to calculate distance from a second target where both the major peak and the minor peak may be referred to as echoes which will be discussed in more detail below.

Although a "major peak TOF" and a "minor peak TOF" are used to describe the detection of one or more peaks for multiple echo detection, the present disclosure is not limited thereto. For example, any suitable detection arrangement may be used depending on the format of the data presented and the application such that a first TOF and/or a second TOF is provided to further describe a scanned environment.

In one or more embodiments, the memory 112 may be implemented as part of the depth detection system 100 or may be implemented externally from the depth detection system 100 and communicably connected to the depth detection system 100. For example, the TOF and event count data may be stored in local memory (e.g., internal memory) or may be transmitted via electronic communication to external memory (e.g., an external storage device, a remote data storage facility, and/or the like) for further processing.

In one or more embodiments, the aggregated histogram may be generated based on saved individual histograms of a plurality of sensing pixels according to a post-processing method, and in other embodiments, the aggregated histogram may be generated as each reflected light signal is detected according to an on-the-fly method which will be discussed in more detail below.

In one or more embodiments, depending on an implementation of the optical sensor 108, aggregated histograms for multiple sensing pixels may be determined or generated. For example, each sensing pixel of a plurality of sensing pixels may detect light, and therefore, an aggregated histogram may be generated for each sensing pixel with each sensing pixel having potentially different neighboring sensing pixels (e.g., different adjacent sensing pixels and/or different directly adjacent sensing pixels).

Each sensing pixel may include one or more light sensing components according to a desired or suitable resolution. For example, increasing the number of light sensing components (e.g., number of photodetectors) per sensing pixel may reduce resolution due to the increased area for accommodating the light sensing components (e.g., an increased area for each of the sensing pixels). On the other hand, decreasing the number of light sensing components (e.g., the number of photodetectors) per sensing pixel may increase resolution because less area may be used to accommodate the light sensing components for each sensing pixel. In other words, in this case, the number of sensing pixels may be increased for each unit area of the sensing array, such that resolution may be correspondingly increased for each unit area. Therefore, in one or more embodiments, a single light sensing component (e.g., a SPAD) per sensing pixel may be used in order to increase resolution, but the present disclosure is not limited thereto. For example, any suitable number of light sensing components per sensing pixel may be used according to an application of the depth detection system 100.

While the processing circuit 114 is illustrated in FIG. 1 as being a part of the depth detection system 100, the processing circuit 114 may be located at the depth detection system 100 or may be located externally from the depth detection system 100. In one or more embodiments, the processing circuit 114 may be a part of multiple redundant processing circuits that may be provided at the depth detection system 100 and at one or more remote locations, respectively.

Figure 2:
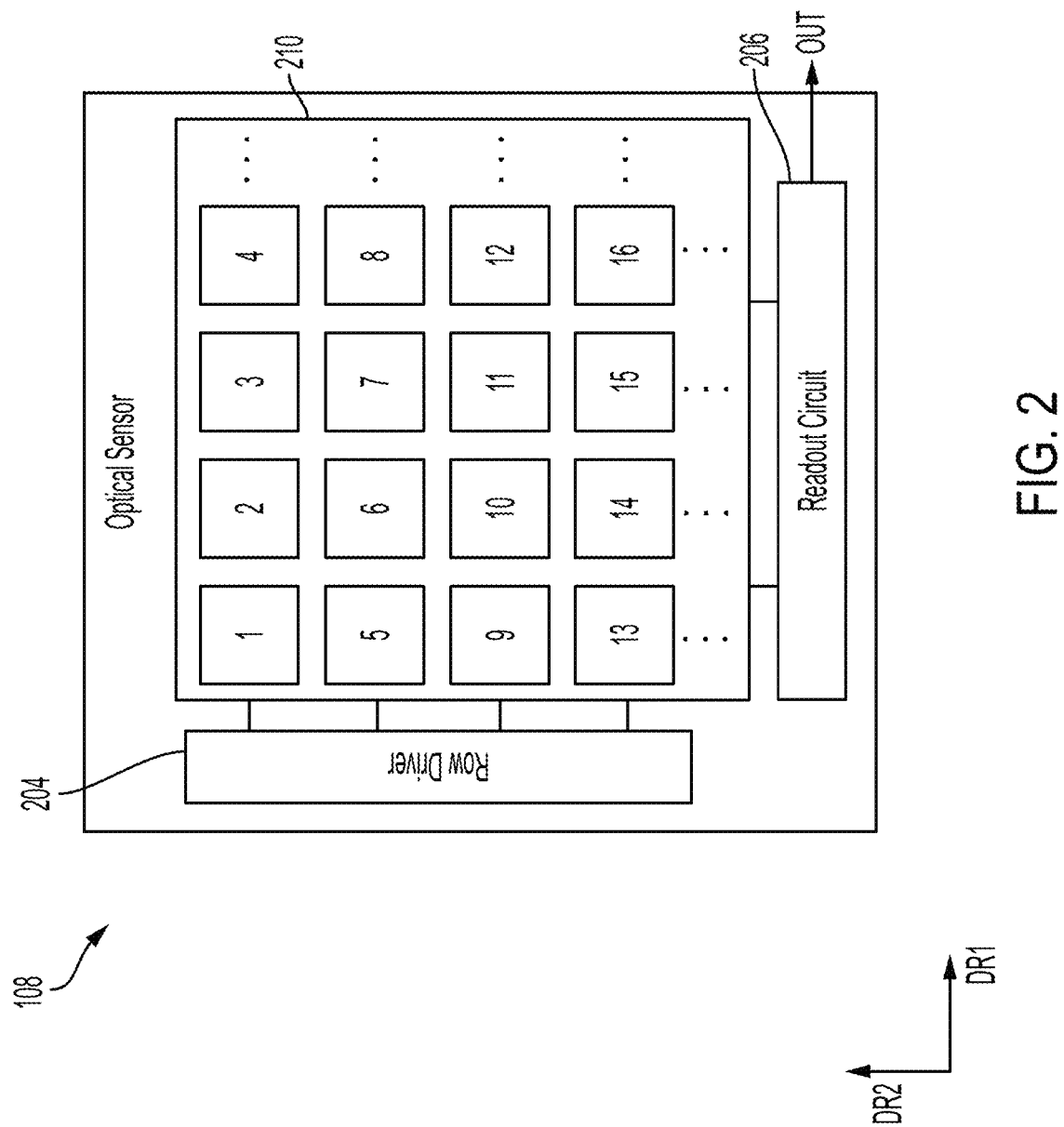
FIG. 2 is a block diagram including an optical sensor, according to one or more embodiments of the present disclosure.

FIG. 2 is a block diagram including an optical sensor, according to one or more embodiments of the present disclosure.

Referring to FIG. 2, in one or more embodiments, the optical sensor 108 may include a row driver 204, a readout circuit 206, and a plurality of sensing pixels 210 arranged into an array of columns and rows. For example, the rows may extend in a first direction DR1, and the columns may extend in a second direction DR2 crossing the first direction DR1. However, the present disclosure is not limited thereto. For example, the plurality of sensing pixels 210 may be arranged into any suitable and ordered lattice (e.g., a square lattice, a diamond lattice, a triangular lattice, and the like) in any suitable direction.

In one or more embodiments, the row driver 204 may transmit driving signals to each of the rows (e.g., sequentially or on a row-by-row basis), and the readout circuit 206 may receive sensing signals from each of the columns of the sensing pixels 210. Accordingly, the row driver 204 may drive each of the sensing pixels 210, and the readout circuit 206 may detect sensing signals from each of the sensing pixels 210.

In the illustrated embodiment, the optical sensor is shown as including a 4×4 array of sensing pixels 210 (indicated by the numbers 1, 2, 3, 4, 5, 6, 7, 8, 9, 10, 11, 12, 13, 14, 15, and 16) for convenience. However the present disclosure is not limited thereto, and the optical sensor may include any suitable number of sensing pixels (e.g., a 100×100 array of sensing pixels) in any suitable arrangement (e.g., rows and columns of varied sizes). Further, each of the sensing pixels may be any suitable and ordered lattice (e.g., a square lattice, a diamond lattice, a triangular lattice, and the like). Sensing pixels arranged along a first direction DR1 may be referred to as a sensing pixel row (e.g., sensing pixels 1, 2, 3, 4) and sensing pixels arranged along a second direction DR2 may be referred to as a sensing pixel column (e.g., sensing pixels 1, 5, 9, 13).

Each sensing pixel in the optical sensor may include one or more light sensing components (i.e., one or more photodetectors) capable of generating a photocurrent (i.e., electric current in response to light) such as, for example, a single-photon avalanche diode ("SPAD") or an avalanche photodiode ("APD"). In one or more embodiments, each of the sensing pixels 210 may include a single SPAD, such that enhanced or high resolution may be provided. However, the present disclosure is not limited thereto, and in other embodiments, each of the sensing pixels 210 may include any suitable number of SPADs according to a design, an application, a structure, and/or the like of the depth detection system 100.

Figure 3:
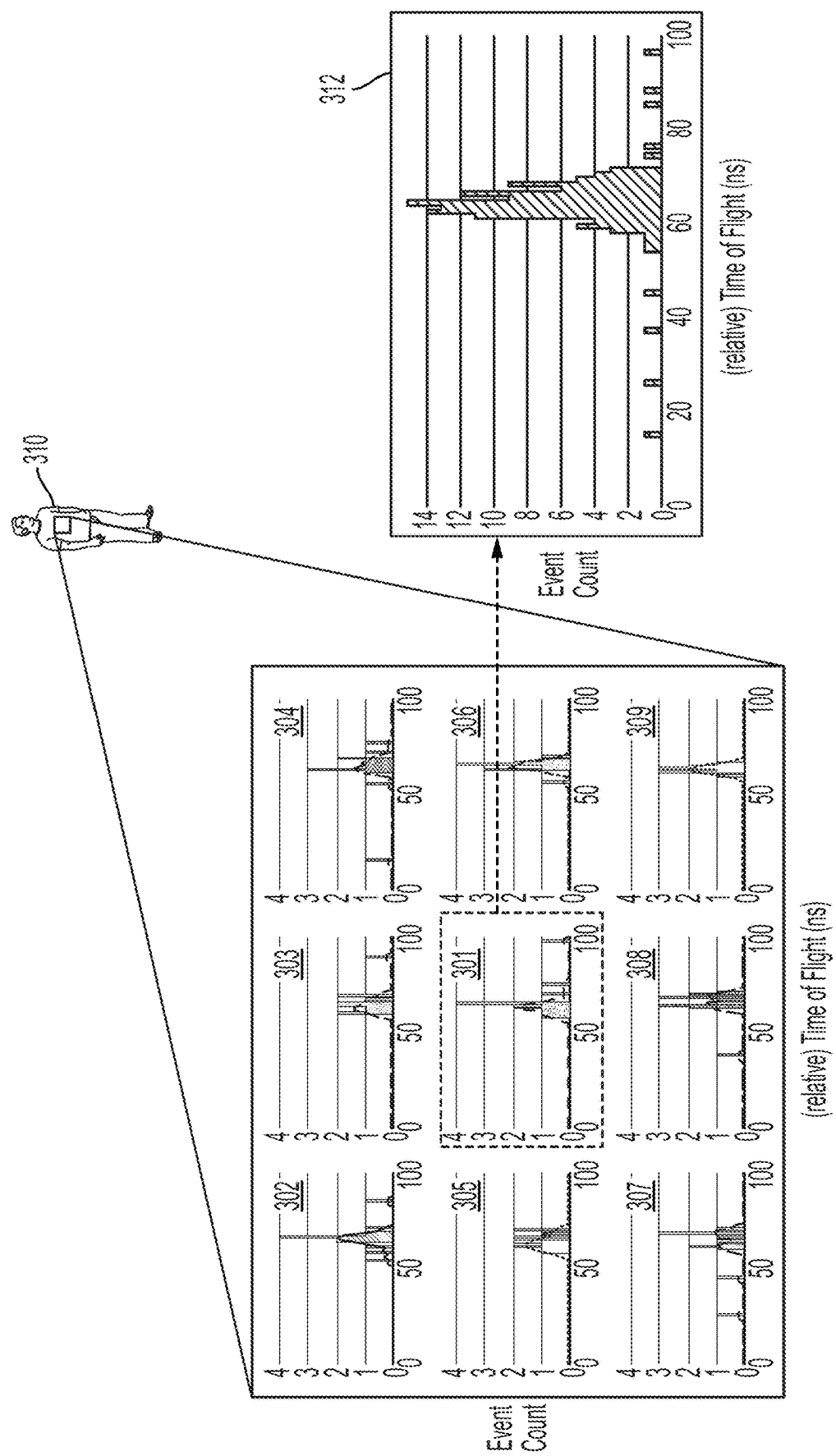
FIG. 3 is a diagram illustrating graphs of individual histograms for sensing pixels and an aggregated histogram based on light reflected from a target, according to one or more embodiments of the present disclosure.

FIG. 3 is a diagram illustrating graphs of individual histograms for sensing pixels and an aggregated histogram based on light reflected from a target, according to one or more embodiments of the present disclosure.

With reference now to FIG. 3, in one or more embodiments, the processing circuit 114 may generate an aggregated histogram 312 based on an individual histogram 301 of a sensing pixel of interest and individual histograms 302, 303, 304, 305, 306, 307, 308, 309 of one or more neighboring sensing pixels (e.g., one or more adjacent and/or directly adjacent sensing pixels), for example, to enhance SNR, improve TOF determination, and/or enable multiple echo detection.

As used herein, a "sensing pixel of interest" refers to a reference frame rather than a property that distinguishes a particular sensing pixel of interest from any other sensing pixel. Therefore, each sensing pixel of the plurality of sensing pixels may be selected as a "sensing pixel of interest" with corresponding changes in reference frame when referring to the relative neighboring sensing pixels (e.g., one or more adjacent and/or directly adjacent sensing pixels) for that particular sensing pixel of interest.

In the illustrated embodiments of FIG. 3, for convenience of illustration, each of the individual histograms 301, 302, 303, 304, 305, 306, 307, 308, 309 of nine sensing pixels are shown to be arranged according to rows and columns similar to the sensing pixels illustrated in FIG. 2. Therefore, the nine sensing pixels are shown according to their relative position in a sensing pixel array. For example, the nine sensing pixels may correspond to the sensing pixels 6, 7, 8, 10, 11, 12, 14, 15, and 16 as illustrated in FIG. 2.

Further, for purposes of illustration, the individual histograms 301, 302, 303, 304, 305, 306, 307, 308, 309 and the aggregated histogram 312 are presented in graphical format in FIG. 3 such that the graph includes, for example, a y-axis indicating a number of reflected light signals or event counts (e.g., the reflected light signals detected corresponding to the laser pulses) and, for example, an x-axis indicating relative TOFs (e.g., measured TOFs) corresponding to the number of events received for each laser pulse based on elapsed time.

In one or more embodiments, the processing circuit 114 may track a time when the light source 102 emits the light pulse, and a time when the light receiver 106 (e.g., the optical sensor 108 thereof) receives the reflected light pulse of the target 310 (e.g., a person). The processing circuit 114 may associate the tracked time (i.e., relative TOF) with a reflected light signal (i.e., an event count) received from a SPAD of each of the nine sensing pixels. The accumulation of event counts associated with a relative TOF may be used to generate individual histograms 301, 302, 303, 304, 305, 306, 307, 308, 309 for each of the sensing pixels.

In this case, in a non-limiting example, each of the individual histograms 301, 302, 303, 304, 305, 306, 307, 308, 309 include a total of 20 event counts corresponding to 20 reflected light signals detected by corresponding sensing pixels. Each of the reflected light signals have an associated relative TOF as determined by the processing circuit 114. As shown in the individual histogram 301 of the sensing pixel of interest, the number of event counts range from 1 to 4 and the relative TOFs range from 50 nanoseconds to 100 nanoseconds. In this case, some of the relative TOFs of the sensing pixel of interest may be the result of noise (e.g., ambient light interference). Therefore, one or more peaks may be determined from the individual histogram to estimate a final TOF (e.g., a major peak TOF). However, the final TOF may be less reliable if SNR is low because the chance of a false-positive TOF may be higher.

Therefore, according to one or more example embodiments of the present disclosure, the individual histogram 301 for a sensing pixel of interest may be binned (e.g., by the processing circuit 114) with one or more of the individual histograms 302, 303, 304, 305, 306, 307, 308, 309 of neighboring sensing pixels (e.g., one or more adjacent and/or directly adjacent sensing pixels) to supplement the individual histogram 301 of the sensing pixel of interest. Binning the individual histogram 301 of the sensing pixel of interest and one or more of the individual histograms 302, 303, 304, 305, 306, 307, 308, 309 of the neighboring sensing pixels (e.g., one or more adjacent and/or directly adjacent sensing pixels) together enables the processing circuit 114 to generate an aggregated histogram 312 for the sensing pixel of interest including a greater number of event counts and a potentially wider range of TOFs, for example, without increasing the number of measurements taken (e.g., without increasing the number of light pulses emitted). In this case, in a non-limiting example, the aggregated histogram 312 includes nine times more event counts (e.g., 180 event counts corresponding to 20 reflected light signals from nine neighboring sensing pixels). In the illustrated embodiment, the aggregated histogram 312 has a greater SNR thereby reducing the chance of a false-positive TOF.

In other words, when one or more of the individual histograms 302, 303, 304, 305, 306, 307, 308, 309 of one or more neighboring sensing pixels (e.g., one or more adjacent and/or directly adjacent sensing pixels) is binned with the individual histogram 301 of the sensing pixel of interest to generate an aggregated histogram 312, the number of data points for the aggregated histogram 312 may be increased, without increasing the number of measurements taken (e.g., the number of light pulses emitted). Accordingly, SNR may be improved without increasing a time and/or number of the measurements, and accordingly, latency or delay may be reduced.

In one or more embodiments, one or more peaks may be determined from the aggregated histogram 312 for peak detection or echo detection. For example, the processing circuit 114 may determine one or more peaks to calculate a major peak TOF and/or any minor peak TOFs. Peaks may be detected according to any suitable method, for example, peaks may be detected based on the number of event counts in a single bin (e.g., the major peak may be the bin with the highest event count) or peaks may be detected after smoothing the aggregated histogram with a box filter (e.g., the major peak may be the highest peak after smoothing with the box filter). In one or more embodiments, the processing circuit 114 may use the major peak TOF to determine or calculate a distance D from the target for the sensing pixel of interest, and/or any minor peak TOFs to calculate another (or secondary) distance from another feature.

In one or more embodiments, the processing circuit 114 may select each of the sensing pixels as a sensing pixel of interest to determine or generate a corresponding aggregated histogram with data from one or more neighboring sensing pixels (e.g., one or more adjacent and/or directly adjacent sensing pixels) for each sensing pixel. However, in the case where a sensing pixel of interest is selected from the first or last sensing pixel column/row of the sensing pixel array, the aggregated histogram for the sensing pixel may be based on less data than a sensing pixel between the first or the last column/row of the sensing pixel array because these sensing pixels may have less neighboring sensing pixels (e.g., one or more adjacent and/or directly adjacent sensing pixels). However, the present disclose is not limited thereto, and any suitable accommodation could be introduced for sensing pixels of interest at an end of a sensing pixel array.

FIG. 4A is a view including a plurality of targets according to one or more embodiments of the present disclosure.

Figure 4B:
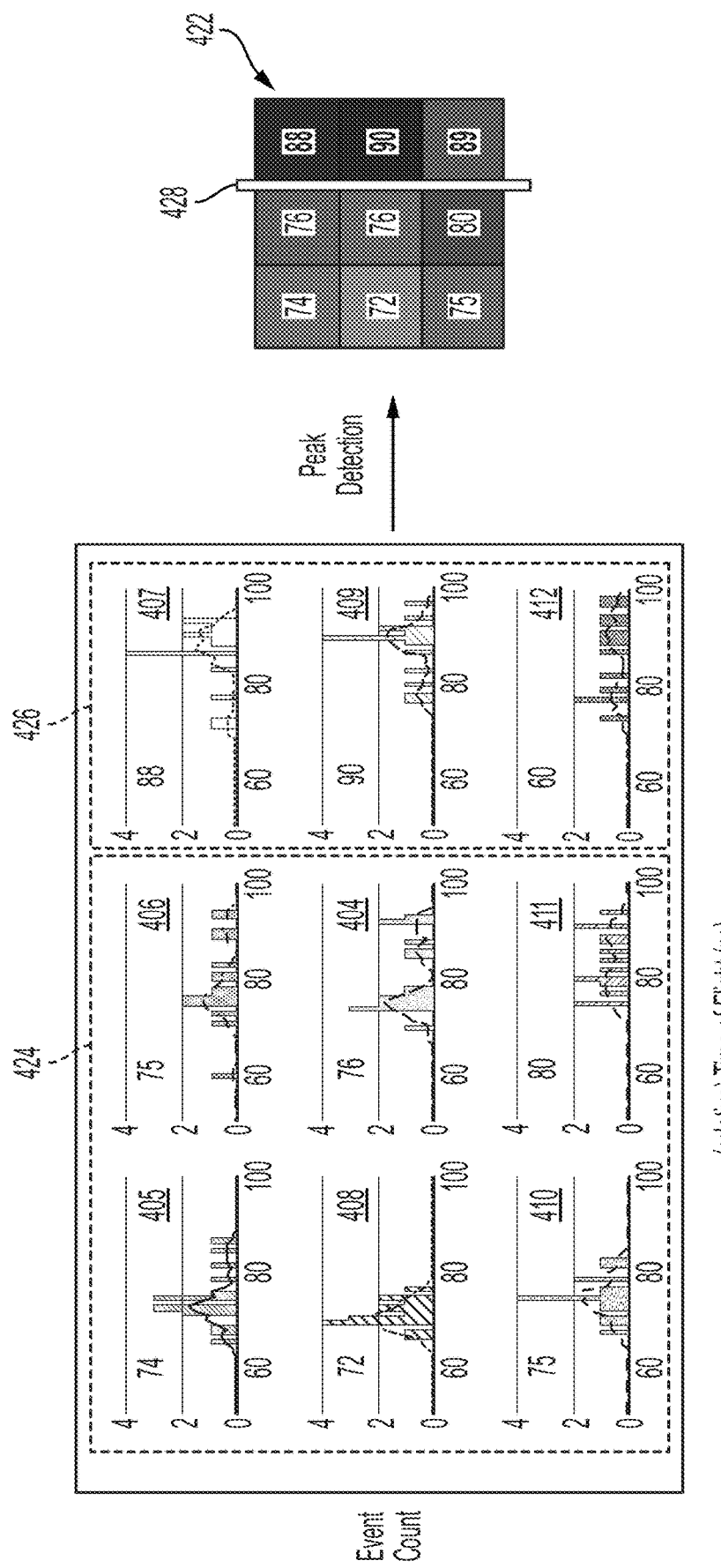
FIG. 4B is a diagram illustrating graphs of individual histograms for sensing pixels and a chart including peak detection values corresponding to the diagram according to one or more embodiments of the present disclosure.

Referring to FIG. 4A, a scene 400 may have a plurality of targets including a first wall 402 and a second wall 403. The first wall 402 and the second wall 403 may be flat surfaces at two different distances from the depth detection system 100. For illustration purposes, a portion 401 of the scene corresponding to a region detected by nine sensing pixels of an optical sensor will be described in more detail in FIGS. 4B-4C.

FIG. 4B is a diagram illustrating graphs of individual histograms for sensing pixels and a chart including peak detection values corresponding to the diagram according to one or more embodiments of the present disclosure.

Referring to FIG. 4B, the processing circuit 114 may determine or generate nine individual histograms 404, 405, 406, 407, 408, 409, 410, 411, 412 corresponding to the nine sensing pixels based on light reflected from the first wall 402 and the second wall 403.

Similar to the individual histograms 301, 302, 303, 304, 305, 306, 307, 308, 309 of FIG. 3, as a non-limiting example, the nine individual histograms 404, 405, 406, 407, 408, 409, 410, 411, 412 may include 20 event counts corresponding to 20 reflected light signals at relative TOFs. In the illustrated embodiment, a first group 424 including individual histograms 404, 405, 406, 408, 410, 411 correspond to sensing pixels indicating distance from the first wall 402, and a second group 426 including individual histograms 407, 409, 412 correspond to sensing pixels indicating distance from the second wall 403.

However, rather than binning one or more individual histograms of one or more neighboring sensing pixels (e.g., one or more adjacent and/or directly adjacent sensing pixels) with the individual histogram of a sensing pixel of interest, as shown in the chart 422, peak detection is performed on the individual histograms 404, 405, 406, 407, 408, 409, 410, 411, 412 directly and a range of major peak TOFs may be present for adjacent sensing pixels. Major peak TOFs on the left of an edge 428 separating the first wall 402 and the second wall 403 range from 74-80 nanoseconds, and major peak TOFs on the right of the edge 428 range from 88-90 nanoseconds. In this case, the range in major peak TOFs may be due to noise for each sensing pixel. Accordingly, a higher SNR may be desirable, for example, by binning the individual histograms of one or more neighboring sensing pixels (e.g., one or more adjacent and/or directly adjacent sensing pixels), as will be described with reference to FIG. 4C.

Figure 4C:
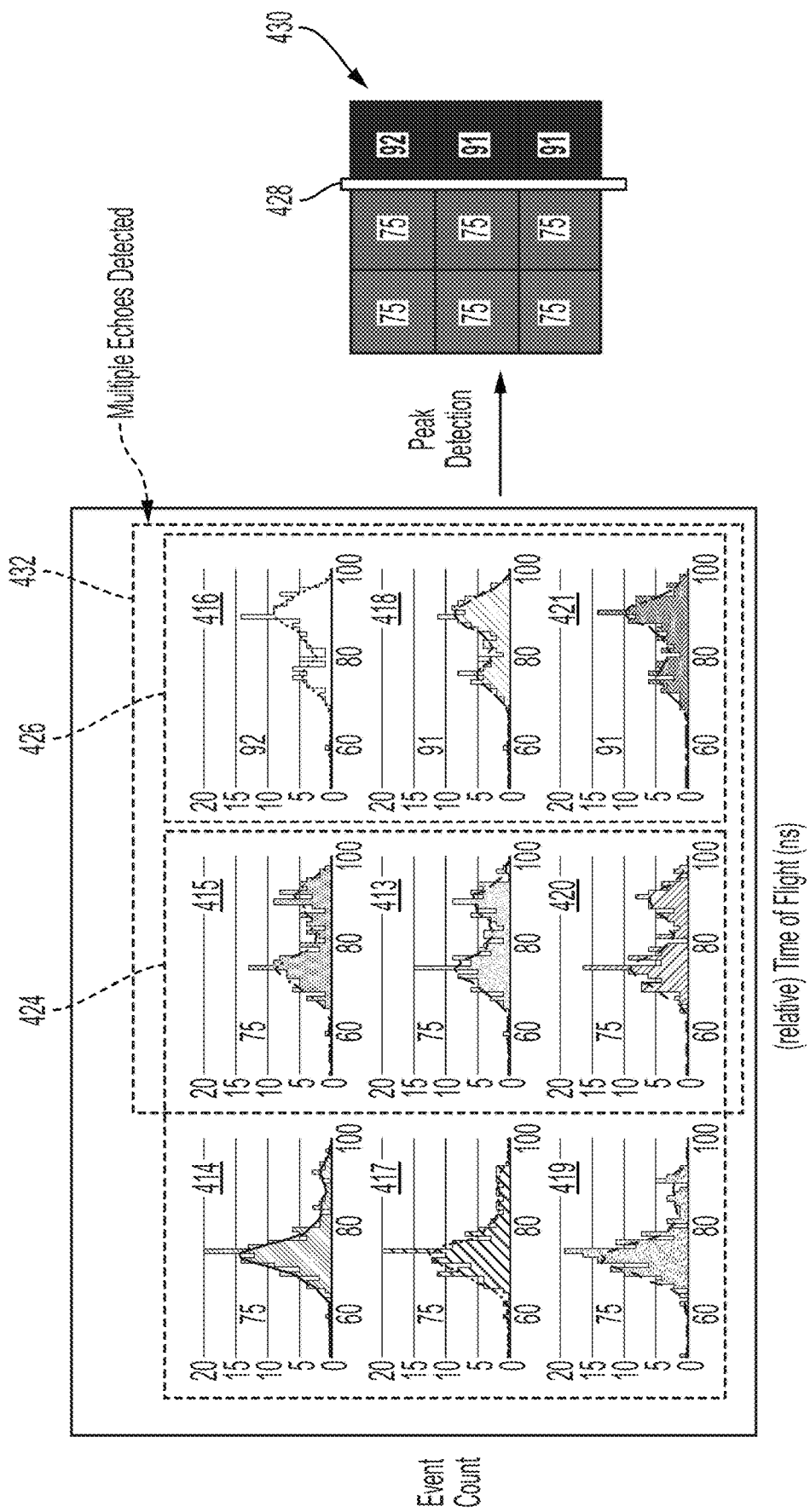
FIG. 4C is a diagram illustrating graphs of aggregated histograms for sensing pixels where multiple echoes are detected and a chart including peak detection, according to one or more embodiments of the present disclosure.

FIG. 4C is a diagram illustrating graphs of aggregated histograms for sensing pixels where multiple echoes are detected and a chart including peak detection, according to one or more embodiments of the present disclosure.

Referring to FIG. 4C, the processing circuit 114 may determine or generate nine aggregated histograms 413, 414, 415, 416, 417, 418, 419, 420, 421 corresponding to the nine sensing pixels based on light reflected from the first wall 402 and the second wall 403.

Similar to the aggregated histogram 312 described with reference to FIG. 3, as a non-limiting example, the aggregated histograms 413, 414, 415, 416, 417, 418, 419, 420, 421 for each of the sensing pixels may have a higher SNR than the corresponding individual histograms 404, 405, 406, 407, 408, 409, 410, 411, 412 shown in FIG. 4B. As shown in FIGS. 4B-4C, the individual histograms 404, 405, 406, 407, 408, 409, 410, 411, 412 have a height (i.e., intensity) that is limited by the number of event counts. By using the processing circuit 114 to generate aggregated histograms 413, 414, 415, 416, 417, 418, 419, 420, 421 by binning the individual histograms 404, 405, 406, 407, 408, 409, 410, 411, 412 with the individual histograms of one or more neighboring sensing pixels (e.g., one or more adjacent and/or directly adjacent sensing pixels), the number of event counts may be increased and SNR may be enhanced as shown in FIG. 4C. In one or more embodiments, the higher intensity values may be represented by an image having a larger bit depth which supports a higher maximum intensity value. Accordingly, higher peaks may lead to higher intensity which then leads to larger bit depth of the intensity image.

In the illustrated embodiment, the first group 424 may include aggregated histograms 413, 414, 415, 417, 419, 420 corresponding to individual histograms 404, 405, 406, 408, 410, 411 indicating distance from the first wall 402 and the second group 426 may include aggregated histograms 416, 418, 421 corresponding to individual histograms 407, 409, 412 indicating distance from the second wall 403. As shown in the chart 430, peak detection is performed on the aggregated histograms 413, 414, 415, 416, 417, 418, 419, 420, 421, and major peak TOFs on the left of an edge 428 separating the first wall 402 and the second wall 403 are at 75 nanoseconds, and major peak TOFs on the right of the edge 428 range from 91-92 nanoseconds. In this case, the peaks detected by the processing circuit 114 for the aggregated histograms 413, 414, 415, 416, 417, 418, 419, 420, 421 may be more stable than the peaks detected based on individual histograms 404, 405, 406, 407, 408, 409, 410, 411, 412. In other words, the major peak TOFs from a target based on the aggregated histograms 413, 414, 415, 416, 417, 418, 419, 420, 421 may be less noisy than the major peak TOF from the target based on individual histograms 404, 405, 406, 407, 408, 409, 410, 411, 412. Further, edge detection may be preserved as shown by the distances detected on either side of the edge 428 between the first wall 402 and the second wall 403.

In one or more embodiments, the processing circuit 114 may identify one or more peaks to detect or determine echoes. Echoes may include major peaks and/or any minor peaks. The minor peaks may provide secondary information regarding a scene such as the presence of a plurality of targets (e.g., a human standing in front of a wall or a first wall overlapping a second wall as shown in FIG. 4A). Echoes may be caused by, for example, a single light pulse directed toward an edge between two different targets such that two reflected light signals may be detected. The two signals may result in two separate peaks that may be identified by the processing circuit 114.

In the illustrated embodiment, the processing circuit 114 may detect multiple echoes in a third group 432 including aggregated histograms 413, 415, 416, 418, 420, 421. Prior to forming the aggregated histograms 413, 415, 416, 418, 420, 421, it would be difficult to detect multiple echoes from the corresponding individual histograms 404, 406, 407, 409, 411, 412 because the SNR may not be high enough to distinguish echoes from noise. Indeed, in a comparative example, a single major peak may be detected to determine a major peak TOF. However, an echo from a minor peak may be presumed to be noise, and therefore, disregarded.

Accordingly, in one or more embodiments, SNR enhancement by binning individual histograms of sensing pixels with individual histograms of neighboring sensing pixels (e.g., one or more adjacent and/or directly adjacent sensing pixels) enables the processing circuit 114 to detect echoes for further information about a scene detected by the depth detection system 100.

Although FIGS. 3-4C illustrate an aggregated histogram based on eight surrounding sensing pixels, any suitable logic may be used by the processing circuit 114, and the number of surrounding sensing pixels may vary. For example, in one or more embodiments, an individual histogram of a sensing pixel of interest may only be binned by the processing circuit 114 with individual histograms of adjacent sensing pixels (e.g., directly adjacent sensing pixels) in a row and/or adjacent sensing pixels (e.g., adjacent sensing pixels) in a column.

Different binning logic may be appropriate for different applications, for example, binning individual histograms of adjacent sensing pixels in a sensing pixel row or a sensing pixel column with each other may be more desirable depending on whether resolution of vertical or horizontal features are important for operation of a device (e.g., a vehicle, a robot, a boat, and the like). Generally, the direction along which the binning is performed may receive the benefit of binning. For example, binning in a horizontal direction may improve resolution of horizontal features and binning in a vertical direction may improve resolution of vertical features.

Although the embodiments of FIGS. 3-4C are described in a square arrangement for the plurality of sensing pixels, embodiments of the present disclosure are not limited to a square arrangement. For example, in the one or more embodiments, the plurality of sensing pixels may be arranged into any regular lattice including a triangle lattice, a diamond lattice, and the like.

In one or more embodiments, the depth detection system 100 may use an on-the-fly method or a post-processing method.

In the on-the-fly method, the processing circuit 114 may generate or update an aggregated histogram in real-time or substantially real-time to provide major peak TOFs and/or minor peak TOFs (e.g., if multiple echoes are detected) "on-the-fly." For example, as each sensing pixel receives a reflected light signal corresponding to an event count, the event count is binned in the relevant aggregated histograms. In a non-limiting example, the relevant aggregated histograms may be aggregated from the individual histogram of the sensing pixel receiving the reflected light signal and the individual histograms of neighboring sensing pixels (e.g., one or more sensing pixels adjacent and/or directly adjacent to the sensing pixel). In one or more embodiments, only aggregated histograms may be stored in memory. Therefore, by storing fewer individual histograms (e.g., no individual histograms), in one or more embodiments, memory space may be saved. However, the present disclosure is not limited thereto. For example, in other embodiments, both an individual histogram and an aggregated histogram may be stored in memory.

In the post-processing method, the processing circuit 114 of the depth detection system 100 may store individual histograms for each sensing pixel of the plurality of sensing pixels in memory. Subsequently, based on binning the stored individual histograms, aggregated histograms may be formed by the processing circuit 114. In other words, the post-processing method may not occur immediately and may generate an aggregated histogram for each sensing pixel at a set or variable intervals (e.g., intervals based on time, volume of data collection, and/or any other suitable factors) using individual histograms stored in memory.

Figure 5:
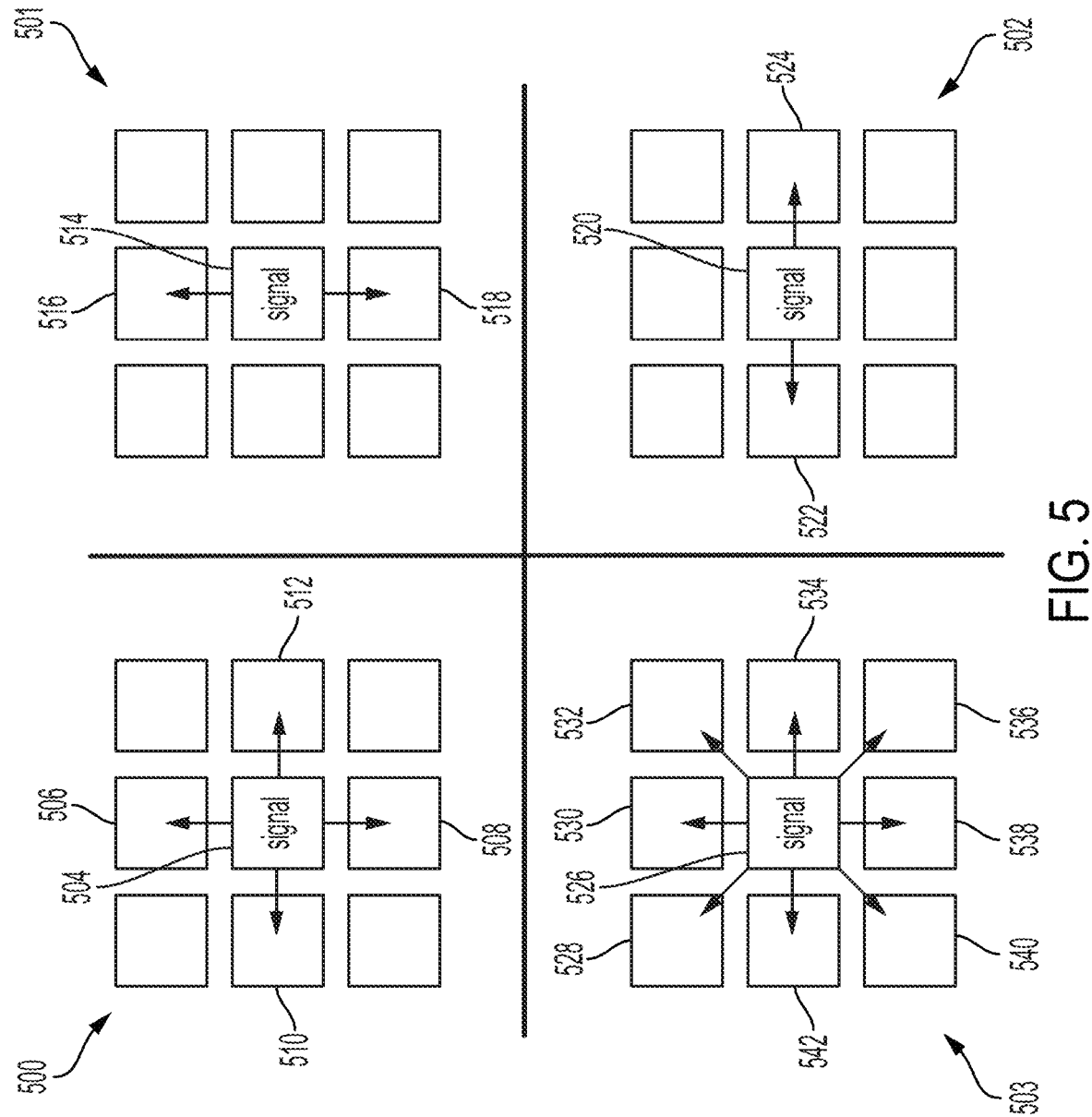
FIG. 5 is a schematic diagram illustrating signal propagation to a plurality of neighboring sensing pixels, according to one or more embodiments of the present disclosure.

FIG. 5 is a schematic diagram illustrating signal propagation to a plurality of neighboring sensing pixels, according to one or more embodiments of the present disclosure.

With reference to FIG. 5, the aggregated histogram may be formed by the processing circuit 114 according to the on-the-fly method. For example, the reflected light signal detected by each of the plurality of sensing pixels may be transmitted or propagated to one or more neighboring sensing pixels (e.g., one or more adjacent and/or directly adjacent sensing pixels) in real time or substantially in real time depending on set (e.g., predetermined) logic. In one or more embodiments, the propagation of reflected light signals may be accomplished by hardware modifications to the array of sensing pixels. For example, when a sensing pixel detects reflected light, the sensing pixel may propagate a reflected light signal to one or more neighboring sensing pixels (e.g., one or more adjacent and/or directly adjacent sensing pixels), such that the propagated reflected light signal may be used to generate an aggregated histogram for each sensing pixel of interest. In other words, by combining the reflected light signals provided by the sensing pixel of interest with the propagated reflected light signals received from one or more neighboring sensing pixels (e.g., one or more adjacent and/or directly adjacent sensing pixels) of the sensing pixel of interest, an aggregated histogram for each sensing pixel of interest may be generated.

In the illustrated embodiment, a first logical arrangement 500, a second logical arrangement 501, a third logical arrangement 502, and a fourth logical arrangement 503 are shown in the upper left, upper right, bottom right, and bottom left quadrants respectively.

In one or more embodiments, a first logical arrangement 500 may include a reflected light signal detected by a first sensing pixel 504. The first sensing pixel 504 may transmit or propagate each reflected light signal detected by the first sensing pixel 504 to directly adjacent sensing pixels 510, 512 in a row direction and directly adjacent sensing pixels 506, 508 in a column direction. Therefore, a processing circuit may generate an aggregated histogram for the sensing pixels 506, 508, 510, 512 including event counts corresponding to each of the reflected light signals received from the first sensing pixel 504 without having to first generate the individual histogram of the sensing pixels.

In one or more embodiments, a second logical arrangement 501 may include a reflected light signal detected by a second sensing pixel 514. The second sensing pixel 514 may transmit or propagate each reflected light signal detected by the second sensing pixel 514 to directly adjacent sensing pixels 516, 518 in a column direction. Therefore, a processing circuit may generate an aggregated histogram for the sensing pixels 516, 518 including event counts corresponding to each of the reflected light signals received from the second sensing pixel 514 without having to first generate the individual histogram of the sensing pixels.

In one or more embodiments, a third logical arrangement 502 may include a reflected light signal detected by a third sensing pixel 520. The third sensing pixel 520 may transmit or propagate each reflected light signal detected by the third sensing pixel 520 to directly adjacent sensing pixels 522, 524 in a row direction. Therefore, a processing circuit may generate an aggregated histogram for the sensing pixels 522, 524 including event counts corresponding to each of the reflected light signals received from the third sensing pixel 520 without having to first generate the individual histogram of the sensing pixels.

In one or more embodiments, a fourth logical arrangement 503 may include a reflected light signal detected by a fourth sensing pixel 526. The fourth sensing pixel 526 may transmit or propagate each reflected light signal detected by the fourth sensing pixel 526 to surrounding directly adjacent sensing pixels 528, 530, 532, 534, 536, 538, 540, 542. Therefore, a processing circuit may generate an aggregated histogram for the sensing pixels 528, 530, 532, 534, 536, 538, 540, 542 including event counts corresponding to each of the reflected light signals received from the fourth sensing pixel 526 without having to first generate the individual histogram of the sensing pixels.

Although four separate logical arrangements 500, 501, 502, 503 are shown in FIG. 5, one or more embodiments of the present disclosure may apply one of the logical arrangements or more than one of the logical arrangements to a sensing pixel array.

Figure 6:
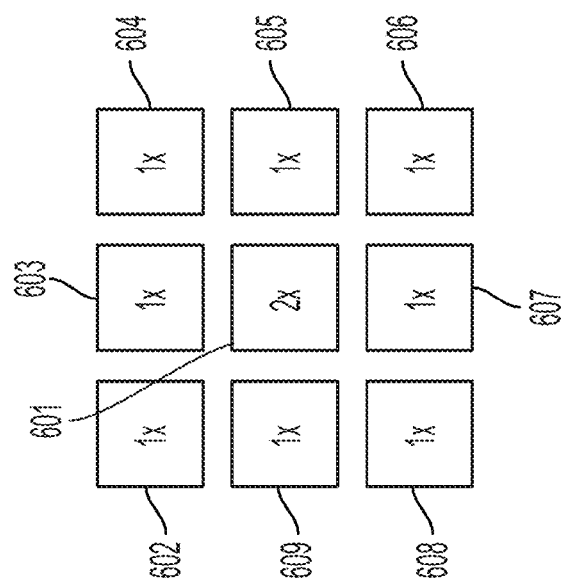
FIG. 6 is a schematic diagram illustrating weighted histogram binning, according to one or more embodiments of the present disclosure.

FIG. 6 is a schematic diagram illustrating weighted histogram binning, according to one or more embodiments of the present disclosure.

With reference to FIG. 6, one or more embodiments of the present disclosure may integrate linear filtering into the generation or determination of an aggregated histogram thereby potentially bypassing the need for linear filtering during image signal processing. In one or more embodiments, linear filtering may be accomplished by the processing circuit 114 by assigning weights to individual histograms from the sensing pixels. For example, when the processing circuit 114 determines or generates an aggregated histogram of a sensing pixel of interest 601, the sensing pixel of interest 601 and each of the neighboring sensing pixels 602, 603, 604, 605, 606, 607, 608, 609 (e.g., one or more adjacent and/or directly adjacent sensing pixels) may be associated with a set (e.g., predetermined) series of weights. In the illustrated embodiment, center-out linear filtering may be performed by the processing circuit 114 when the processing circuit 114 applies a 2× weight to the event counts of the sensing pixel of interest 602 (i.e., the event counts from the sensing pixel of interest 602 or the center sensing pixel may be counted twice) and a 1× weight to event counts of the neighboring sensing pixels 602, 603, 604, 605, 606, 607, 608, 609 (i.e., the event counts from one or more adjacent and/or directly adjacent sensing pixels may be counted once). However, embodiments of the present disclose are not limited thereto and any suitable integer weight value and arrangement may be set (e.g., predetermined) for the sensing pixels depending on the type of linear filtering desired. For example, edge linear filtering may be performed where the processing circuit 114 applies a 1× weight to the event counts of the sensing pixel of interest and a 2× weight to the event counts directly adjacent to one side of the sensing pixel of interest (e.g., sensing pixels 604, 605, 606 at one side of sensing pixel of interest 601).

Accordingly, one or more embodiments of the present disclosure provide for a weighted binning method to linearly filter an image. The weighted binning method may be applied in the post-processing method and/or the on-the-fly method.

Figure 7:
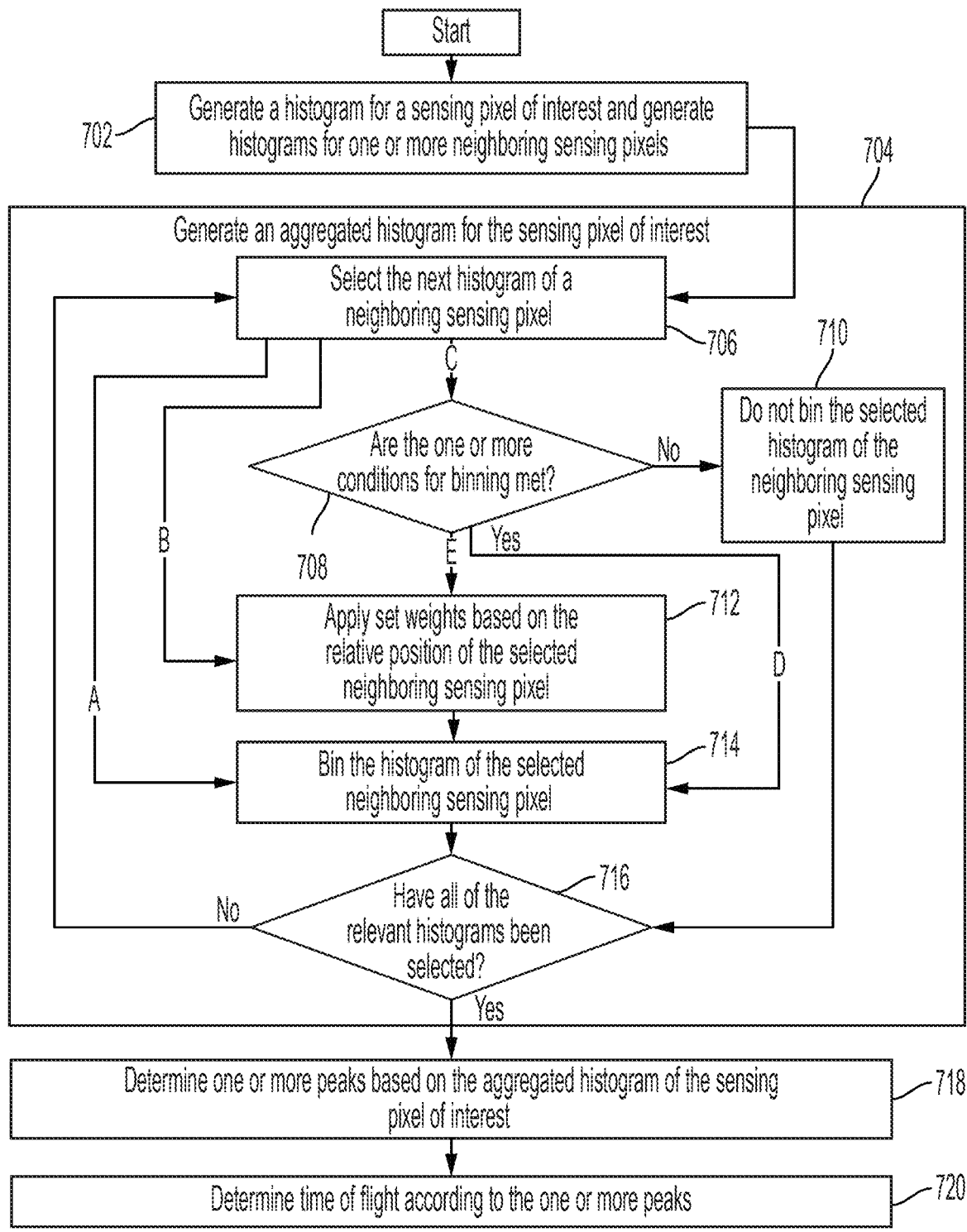
FIG. 7 is a flow chart of a method for determining time-of-flight, according to one or more embodiments of the present disclosure.

FIG. 7 is a flow chart of a method for determining time-of-flight, according to one or more embodiments of the present disclosure.

With reference to FIG. 7, the processing circuit 114 in one or more embodiments of the present disclosure may select a sensing pixel of interest. The processing circuit 114 may determine or generate a histogram for the sensing pixel of interest and determine or generate histograms for one or more neighboring sensing pixels (702) (e.g., one or more adjacent and/or directly adjacent sensing pixels).

Based on the histograms, the processing circuit 114 may determine or generate an aggregated histogram for the sensing pixel of interest (704). The aggregated histogram for the sensing pixel of interest may include the histogram of the sensing pixel of interest binned with the histograms of one or more neighboring sensing pixels (e.g., one or more adjacent and/or directly adjacent sensing pixels) according to any suitable set (e.g., predetermined) logic. For example, in one or more embodiments, the processing circuit 114 may consider all sensing pixels directly adjacent to the sensing pixel of interest, in other embodiments, the processing circuit 114 may consider sensing pixels directly adjacent in a row, and in another embodiment, the processing circuit 114 may consider sensing pixels directly adjacent in a column.

Therefore, in one or more embodiments, the processing circuit 114 may select a histogram of a neighboring sensing pixel (706) (e.g., an adjacent and/or directly adjacent sensing pixels) according to set logic after generating histograms of one or more neighboring sensing pixels (702) (e.g., one or more adjacent and/or directly adjacent sensing pixels). After selecting a histogram of the neighboring sensing pixel (706) (e.g., an adjacent and/or directly adjacent sensing pixels), the processing circuit 114 may follow one of three paths indicated by A, B, and C according to one or more embodiments.

In one or more embodiments according to path A, the processing circuit 114 may bin the histogram of the selected neighboring sensing pixel (714). The processing circuit 114 may then determine whether all of the relevant histograms of neighboring sensing pixels (e.g., one or more adjacent and/or directly adjacent sensing pixels) have been selected (716). If there are any relevant histograms of neighboring sensing pixels (e.g., relevant histograms of neighboring sensing pixels based on set logic such as directly adjacent sensing pixels, directly adjacent sensing pixels in a row, directly adjacent sensing pixels in a column, and the like) that have not been selected, then the processing circuit 114 returns to step (706) and selects the next histogram of a neighboring sensing pixel (706) (e.g., an adjacent and/or directly adjacent sensing pixels). In one or more embodiments, the processing circuit 114 follows the same loop for path A until all of the relevant histograms for a sensing pixel of interest have been selected. Accordingly, an aggregated histogram for the sensing pixel of interest may be generated (704).

In one or more embodiments according to path B, the processing circuit 114 may apply set weights based on the relative position of the selected neighboring sensing pixel (712). For example, as shown in FIG. 6, the relative position (e.g., relative to the sensing pixel of interest) of the neighboring sensing pixel corresponding to the selected histogram may determine the value of a weight applied to the event counts of the selected histogram prior to binning. Depending on the set weight value a multiplier may be applied to the event counts of the selected histogram. After applying the set weight value, the processing circuit 114 may bin the histogram of the selected neighboring sensing pixel (714). The processing circuit 114 may then determine whether all of the relevant histograms of neighboring sensing pixels (e.g., one or more adjacent and/or directly adjacent sensing pixels) have been selected (716). If there are any relevant neighboring sensing pixels (e.g., relevant neighboring sensing pixels based on set logic such as directly adjacent sensing pixels, directly adjacent sensing pixels in a row, directly adjacent sensing pixels in a column, and the like) that have not been selected, then the processing circuit 114 returns to step 706 and selects the next histogram of a neighboring sensing pixel (706) (e.g., an adjacent and/or directly adjacent sensing pixels). In one or more embodiments, the processing circuit 114 follows the same loop for path B until all of the relevant histograms for a sensing pixel of interest have been selected. Accordingly, an aggregated histogram for the sensing pixel of interest may be generated (704).

In one or more embodiments according to path C, the processing circuit 114 may apply condition logic to determine whether one or more conditions for binning are met (708). The one or more conditions may include any suitable condition such as whether a threshold for the quality of signal indicated in the histogram is satisfied and/or whether a threshold correlation between the histogram of the sensing pixel of interest and the histogram of the selected histogram is satisfied. The threshold may be set by the processing circuit 114 or may be a variable parameter set by the user.

In one or more embodiments, signal quality may be any suitable metric or characteristic of the selected histogram. For example, the outer limits of the spread or range of relative TOFs in the histogram may be used as an indication of signal quality. In a non-limiting example, a certain percentage of the overall range of the system may be used, for example, if the range is 15 meters/100 nanoseconds, then the outer limits of the spread may be 40% of 100 nanoseconds which is 40 nanoseconds. Further, the maximum height of the histogram may be used as an indication of signal quality. Accordingly, a threshold may be set for any one or more of these characteristics to determine whether the histogram of the sensing pixel of interest may be binned with the selected histogram.

As another example, correlation between the histogram of the sensing pixel of interest and selected histogram may be determined. For non-limiting example, referring to the embodiment of FIG. 4B, the histograms 404, 405, 406, 407, 408, 409, 410, 411, 412 based on data from the nine sensing pixels may have a particular shape or curve in a histogram. In this case, histograms 404, 406, 411 for the sensing pixels in the center column are more closely correlated to histograms 405, 408, 410 for sensing pixels in the left column than the histograms 407, 409, 412 for sensing pixels in the right column. Accordingly, in this non-limiting example, the threshold for correlating data may be set such that histograms 404, 406, 411 of sensing pixels in the center column may be binned with histograms 405, 408, 410 of sensing pixels from the left column and vice versa, however, histograms 404, 405, 406, 408, 410 411 of the left column and the center column may not be binned with histograms 407, 409, 412 of sensing pixels from the right column. In this non-limiting example, conditional binning may further assist in detecting the edge 428.

If the one or more conditions are not met, the processing circuit 114 does not bin the selected histogram of the neighboring sensing pixel (710), and the processing circuit 114 may then determine whether all of the relevant histograms of neighboring sensing pixels (e.g., one or more adjacent and/or directly adjacent sensing pixels) have been selected (716). If there are any relevant neighboring sensing pixels (e.g., relevant neighboring sensing pixels based on set logic such as directly adjacent sensing pixels, directly adjacent sensing pixels in a row, directly adjacent sensing pixels in a column, and the like) that have not been selected, then the processing circuit 114 returns to step 706 and selects the next histogram of a neighboring sensing pixel (706) (e.g., an adjacent and/or directly adjacent sensing pixels).

After meeting the one or more conditions, the processing circuit may follow path E or path D. Based on path D, the processing circuit 114 may bin the histogram of the selected neighboring sensing pixel (714). The processing circuit 114 may then determine whether all of the relevant histograms of neighboring sensing pixels (e.g., one or more adjacent and/or directly adjacent sensing pixels) have been selected (716). If there are any relevant neighboring sensing pixels (e.g., relevant neighboring sensing pixels based on set logic such as directly adjacent sensing pixels, directly adjacent sensing pixels in a row, directly adjacent sensing pixels in a column, and the like) that have not been selected, then the processing circuit 114 returns to step 706 and selects the next histogram of a neighboring sensing pixel (706) (e.g., an adjacent and/or directly adjacent sensing pixels). In one or more embodiments, the processing circuit 114 follows the same loop for paths C and D (unless a condition is not met) until all of the relevant histograms for a sensing pixel of interest have been selected. Accordingly, an aggregated histogram for the sensing pixel of interest may be generated (704).

In one or more embodiments, after meeting the one or more conditions, the processing circuit may follow path E. In this case, the processing circuit may apply one or more set weights based on the relative position of the selected neighboring sensing pixel (712). For example, as shown in FIG. 6, the relative position (e.g., relative to the sensing pixel of interest) of the neighboring sensing pixel corresponding to the selected histogram may determine the value of a weight applied to the event counts of the selected histogram prior to binning. Depending on the set weight value a multiplier may be applied to the event counts of the selected histogram. After applying the set weight value, the processing circuit 114 may bin the histogram of the selected neighboring sensing pixel (714). The processing circuit 114 may then determine whether all of the relevant histograms of neighboring sensing pixels (e.g., one or more adjacent and/or directly adjacent sensing pixels) have been selected (716). If there are any relevant neighboring sensing pixels (e.g., relevant neighboring sensing pixels based on set logic such as directly adjacent sensing pixels, directly adjacent sensing pixels in a row, directly adjacent sensing pixels in a column, and the like) that have not been selected, then the processing circuit 114 returns to step 706 and selects the next histogram of a neighboring sensing pixel (706) (e.g., an adjacent and/or directly adjacent sensing pixels). In one or more embodiments, the processing circuit 114 follows the same loop for path C and E (unless a condition is not met) until all of the relevant histograms for a sensing pixel of interest have been selected. Accordingly, an aggregated histogram for the sensing pixel of interest may be generated (704).

After generating the aggregated histogram for the sensing pixel of interest (704), the processing circuit 114 may determine one or more peaks (e.g., a major peak and one or more minor peaks) based on the aggregated histogram of the sensing pixel of interest (718). The one or more peaks may be designated as a major peak or a minor peak. In one or more embodiments, the major peak may be the peak having greater depth than any other peaks in the histogram and the minor peak may be the peak with lesser depth than the major peak in the histogram.

After determining one or more peaks based on the aggregated histogram of the sensing pixel of interest (718), the processing circuit 114 may determine TOF according to the one or more peaks (720). The major peak may be used to calculate or determine a major peak TOF corresponding to distance from a target and the minor peak may be used to calculate or determine a minor peak TOF providing secondary information regarding another target or feature in a scene.

Figure 8:
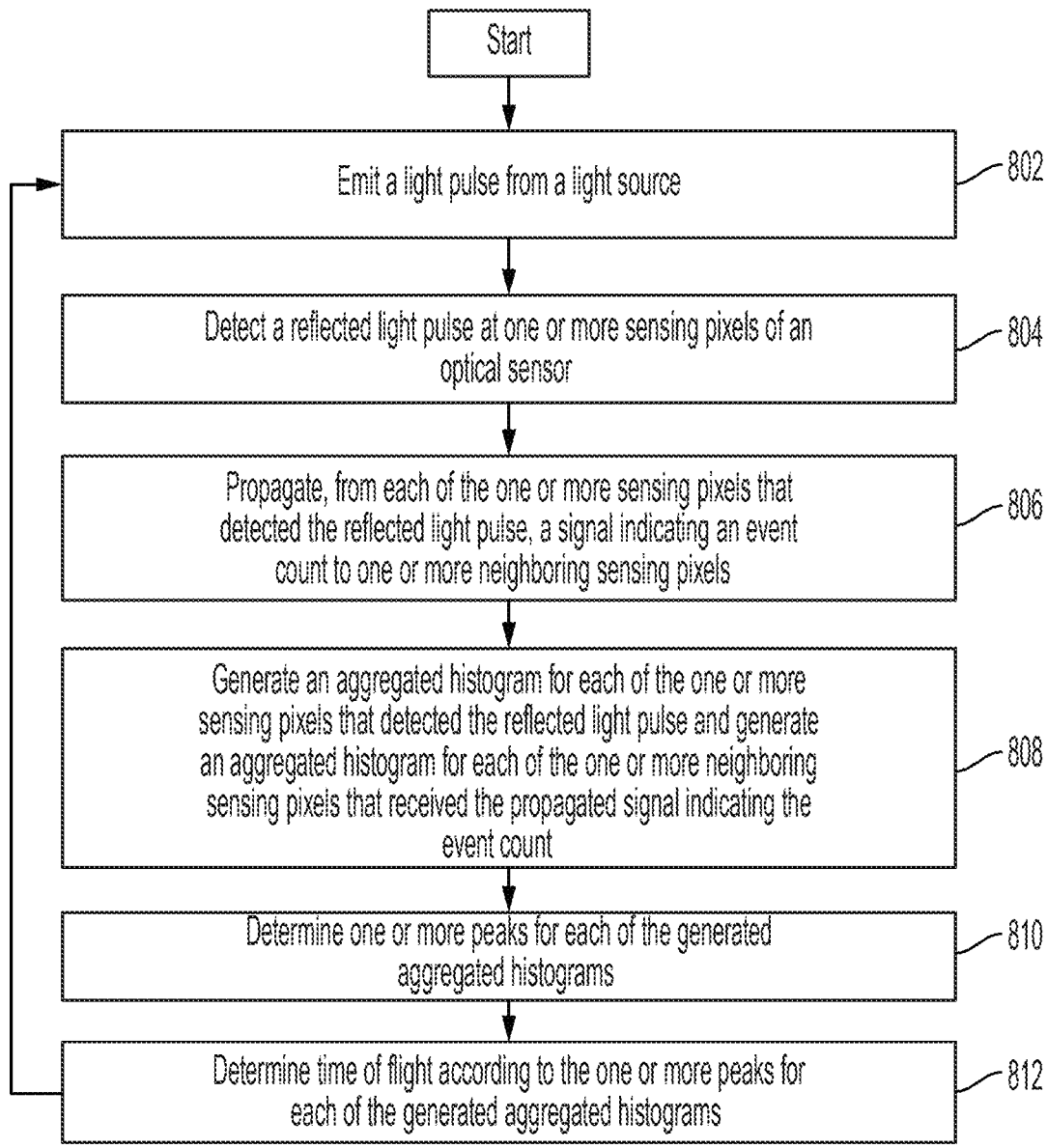
FIG. 8 is a flow chart of a method for determining time-of-flight, according to one or more embodiments of the present disclosure.

FIG. 8 is a flow chart of a method for determining time-of-flight, according to one or more embodiments of the present disclosure.

With reference to FIG. 8, the aggregated histogram may be formed by the processing circuit 114 according to the on-the-fly method.

In one or more embodiments, a light source 102 may emit a light pulse (802). Based on the reflection of the light pulse off a target, one or more sensing pixels of an optical sensor

108 may detect a reflected light pulse (804) and provide an event count corresponding to the detection of the reflected light pulse.

According to set (e.g., predetermined) logic as shown and described with reference to the one or more embodiments of FIG. 5, each of the one or more sensing pixels that detected the reflected light pulse may propagate a signal indicating an event count to one or more neighboring sensing pixels (e.g., one or more adjacent and/or directly adjacent sensing pixels) in real time or substantially in real time.

In response to a sensing pixel receiving a propagated signal or detecting a reflected light pulse, the processing circuit 114 may generate or update an aggregated histogram corresponding to that sensing pixel. In other words, an aggregated histogram may be generated or updated for each of the one or more sensing pixels that detected the reflected light pulse and an aggregated histogram may be generated or updated for each of the one or more neighboring sensing pixels that received the propagated signal indicating the event count (808). The processing circuit 114 may also save the recently aggregated or updated histogram in memory. In one or more embodiments, the recently aggregated or updated histogram overwrites, replaces, or updates the previous aggregated or updated histogram corresponding to a particular sensing pixel.

When the processing circuit 114 generates or updates the aggregated histogram corresponding to a sensing pixel, the processing circuit 114 may determine one or more peaks for each of the aggregated or updated histogram of the sensing pixel (810). The processing circuit 114 may then determine TOF (e.g., a major peak TOF and/or a minor peak TOF) according to the one or more peaks for each of the generated aggregated histograms (812).

Accordingly, aggregated histograms, and therefore, TOFs may be provided in real-time or substantially real-time for computer vision applications without waiting for individual histograms to be generated and binned with other individual histograms. Further, by storing only the aggregated histograms and not individual histograms, space in memory may be saved. However, the present disclosure is not limited thereto. For example, in one or more embodiments, the processing circuit 114 may distinguish between propagated signals and detected signals to save individual histograms for each sensing pixel in memory as desired.

Accordingly, as disclosed herein, embodiments of the present disclosure improve depth of sensing pixel intensity to enhance SNR, include multiple echo detection, and provide a high resolution light detection array. Further, systems and methods of one or more embodiments of the present disclosure provide enhanced or high resolution (e.g., via sensing pixels having a single SPAD) without pending additional real-world measurements (e.g., additional laser pulses) that adversely impact speed (e.g., frames per second).

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

In the drawings, the relative sizes of elements, layers, and regions may be exaggerated and/or simplified for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A depth detection system comprising:
   a light source configured to emit a light pulse toward an object;
   an optical sensor configured to detect the light pulse reflecting off the object, the optical sensor comprising a first sensing pixel configured to detect the light pulse for a first event count according to the light pulse reflecting off the object, and a second sensing pixel configured to detect the light pulse for a second event count according to the light pulse reflecting off the object; and
   a processing circuit configured to:
      determine a first histogram based on the first event count;
      determine a second histogram based on the second event count;
      determine a first aggregated histogram corresponding to the first sensing pixel based on the first event count and the second event count by binning the second histogram with the first histogram in response to whether a threshold for signal quality corresponding to an allowable range of outer limits of a spread or range of relative time of flights indicated by the second histogram is satisfied; and
      determine a first peak of the first aggregated histogram to determine a first time of flight associated with the first sensing pixel.

2. The depth detection system of claim 1, wherein each of the first sensing pixel and the second sensing pixel comprises a single SPAD.

3. The depth detection system of claim 1, wherein the processing circuit is further configured to determine a second peak of the first aggregated histogram to determine a second time of flight associated with the first sensing pixel.

4. The depth detection system of claim 1, further comprising a third sensing pixel configured to detect the light pulse for a third event count according to the light pulse reflecting off the object,
   wherein the first sensing pixel, the second sensing pixel, and the third sensing pixel are arranged in a sensing pixel row, and
   wherein the processing circuit is further configured to determine the first aggregated histogram corresponding to the first sensing pixel based on the first event count, the second event count, and the third event count.

5. The depth detection system of claim 1, further comprising a third sensing pixel configured to detect the light pulse for a third event count according to the light pulse reflecting off the object,
   wherein the first sensing pixel, the second sensing pixel, and the third sensing pixel are arranged in a sensing pixel column, and
   wherein the processing circuit is further configured to determine the first aggregated histogram corresponding to the first sensing pixel based on the first event count, the second event count, and the third event count.

6. The depth detection system of claim 1, wherein the processing circuit is further configured to determine the first aggregated histogram corresponding to the first sensing pixel based on the first event count and the second event count by applying a weight to the first event count or the second event count.

7. The depth detection system of claim 1, wherein the processing circuit is further configured to:
   determine the first aggregated histogram corresponding to the first sensing pixel based on the first event count and the second event count by binning the second histogram with the first histogram in response to whether a threshold for correlation between the first histogram and the second histogram is satisfied, the threshold for correlation being distinct from the threshold for signal quality.

8. A method of histogram binning, the method comprising:
   emitting, by a light source, a light pulse toward an object;
   detecting, by an optical sensor, the light pulse reflecting off the object;
   detecting the light pulse for a first event count, by a first sensing pixel of the optical sensor, according to the light pulse reflecting off the object;
   detecting the light pulse for a second event count, by a second sensing pixel of the optical sensor, according to the light pulse reflecting off the object;
   determining, by a processing circuit, a first histogram based on the first event count;
   determining, by the processing circuit, a second histogram based on the second event count;
   determining, by the processing circuit, a first aggregated histogram corresponding to the first sensing pixel based on the first event count and the second event count by binning the second histogram with the first histogram in response to whether a threshold for signal quality corresponding to an allowable range of outer limits of a spread or range of relative time of flights indicated by the second histogram is satisfied; and
   determining, by the processing circuit, a first peak of the first aggregated histogram to determine a first time of flight associated with the first sensing pixel.

9. The method of claim 8, wherein each of the first sensing pixel and the second sensing pixel comprises a single SPAD.

10. The method of claim 8, the method further comprising determining, by the processing circuit, a second peak of the first aggregated histogram to determine a second time of flight associated with the first sensing pixel.

11. The method of claim 8, the method further comprising:
   detecting the light pulse for a third event count, by a third sensing pixel of the optical sensor, according to the light pulse reflecting off the object, wherein the first sensing pixel, the second sensing pixel, and the third sensing pixel are arranged in a sensing pixel row, wherein the determining, by the processing circuit, the first aggregated histogram corresponding to the first sensing pixel is based on the first event count, the second event count, and the third event count.

12. The method of claim 8, the method further comprising:

detecting the light pulse for a third event count, by a third sensing pixel of the optical sensor, according to the light pulse reflecting off the object, wherein the first sensing pixel, the second sensing pixel, and the third sensing pixel are arranged in a sensing pixel column, wherein the determining, by the processing circuit, the first aggregated histogram corresponding to the first sensing pixel is based on the first event count, the second event count, and the third event count.

13. The method of claim 8, wherein the determining, by the processing circuit, the first aggregated histogram corresponding to the first sensing pixel based on the first event count and the second event count comprises applying a weight to the first event count or the second event count.

14. The method of claim 8, wherein the determining, by the processing circuit, the first aggregated histogram corresponding to the first sensing pixel based on the first event count and the second event count further comprises binning the second histogram with the first histogram in response to whether a threshold for correlation between the first histogram and the second histogram is satisfied, the threshold for correlation being distinct from the threshold for signal quality.

15. A method of histogram binning, the method comprising:

selecting, by a processing circuit, a first sensing pixel of interest;

generating, by the processing circuit, a first histogram for a sensing pixel of interest and a second histogram for a sensing pixel adjacent to the sensing pixel of interest based on signals received by an optical sensor;

generating, by the processing circuit, a first aggregated histogram for the first sensing pixel of interest based on the first histogram and the second histogram, by binning the first histogram with the second histogram in response to a threshold for signal quality corresponding to an allowable range of outer limits of a spread or range of relative time of flights indicated by the second histogram being satisfied; and determining, by the processing circuit, a first peak of the first aggregated histogram to determine a first time of flight associated with the sensing pixel of interest.

16. The method of claim 15, the method further comprising determining, by the processing circuit, a second peak of the first aggregated histogram to determine a second time of flight associated with the sensing pixel of interest.

17. The method of claim 15, wherein the generating, by the processing circuit, the first aggregated histogram for the first sensing pixel of interest based on the first histogram and the second histogram comprises applying a weight to the first histogram or the second histogram prior to binning the first histogram with the second histogram.

* * * * *